United States Patent [19]
Rakestraw et al.

[11] Patent Number: 5,458,836
[45] Date of Patent: Oct. 17, 1995

[54] POLYMER EXTRUSION DIE AND USE THEREOF

[75] Inventors: Julie A. Rakestraw, Newark; Marion G. Waggoner, Hockessin, both of Del.

[73] Assignee: E. I. Du Pont de Nemours and Company, Wilmington, Del.

[21] Appl. No.: 212,080

[22] Filed: Mar. 11, 1994

[51] Int. Cl.$^6$ .................................................. B29C 47/12
[52] U.S. Cl. .......................... 264/169; 264/143; 264/323; 264/211.23; 425/308; 425/382 R; 425/461
[58] Field of Search .......................... 264/169, 141–143, 264/323, 176.1, 211.23; 425/308, 463, 464, 382 R, 461

[56] References Cited

U.S. PATENT DOCUMENTS

| | | | |
|---|---|---|---|
| 3,129,458 | 4/1964 | Mitchell | 425/464 |
| 3,244,786 | 4/1966 | Bild | 264/169 |
| 3,391,657 | 7/1968 | Reese | 425/461 |
| 4,056,597 | 11/1977 | Cooper | 425/464 |
| 4,138,208 | 2/1979 | Heckeroth | 425/308 |
| 4,203,942 | 5/1980 | Sims, Jr. et al. | 264/178 R |
| 4,380,424 | 4/1983 | Skoch et al. | 425/382 R |
| 4,485,062 | 11/1984 | Dawes et al. | 264/176.1 |
| 4,769,193 | 9/1988 | Marchesani | 425/308 |
| 4,822,546 | 4/1989 | Lohkamp | 264/143 |
| 4,838,775 | 6/1989 | Hunke | 425/308 |
| 5,008,056 | 4/1991 | Kurtz et al. | 264/130 |

FOREIGN PATENT DOCUMENTS 61-00614 1/1986 Japan .................................. 264/169

*Primary Examiner*—Jeffery R. Thurlow

[57] ABSTRACT

An improved die, containing one or more orifices, for the extrusion of polymers is disclosed wherein the orifices are flared at the polymer discharge end, and the orifices have certain relative dimensions and configurations. The dies are useful for producing items such as films, shaped profiles, sheets, fibers, strands, etc. Also disclosed are a process for using the die, and an extrusion apparatus containing such a die.

15 Claims, 2 Drawing Sheets

POLYMER EXTRUSION DIE AND USE THEREOF

FIELD OF THE INVENTION

This invention concerns an improved die for the extrusion of polymers, wherein the exit of the die orifice(s) is flared, and the flared and unflared sections have specified relative dimensions and shapes.

TECHNICAL BACKGROUND

Extrusion of polymers through a die to form shaped extrudates is a well known process, and is extensively used commercially, see for instance H. Mark, et al., Ed., Encyclopedia of Polymer Science and Engineering, 2nd Ed., vol. 6, John Wiley & Sons, New York, 1986, p. 571–631 and p. 802–824 (fibers), which is hereby included by reference. Items that can be made by polymer extrusion include films, fibers, sheet, strands (including those strands to be cut into pellets for further processing), and shaped profiles. The extrudates are usually essentially continuous, and are often cut into useable lengths.

The extrusion process is one in which the molten polymer is forced through a shaped orifice, and the extrudate is then cooled, usually until solid. The cross section of the extrudate (perpendicular to the flow direction) usually has the same shape as the orifice. Due to the importance of extrusion commercially, improved dies are constantly being sought, so that the process runs more cheaply, and/or with less off-quality production, etc. A particular problem in this process is "die drips", which are small portions of (usually) molten polymer which collect around the die orifice, and which can cause problems of product defects and downtime.

U.S. Pat. No. 4,822,546 describes a polymer extrusion die which is advantageous for use with high flow polymers and wherein the die is part of an underwater pelletizer. There is no mention of the use of this die in other extrusion processes.

SUMMARY OF THE INVENTION

This invention concerns a die having flared orifices for the extrusion of polymers, comprising, a die body having one or more flared orifices having the following components:

a first zone having surface $S_1$;

a second zone having surface $S_2$;

a third zone having surface $S_3$;

a length $L_1$ which is the total length of said first, second and third zones;

a length $L_3$ which is the length of said third zone;

a polymer flow axis A; and said die has a surface $S_5$ on a discharge side of said die; and wherein:

$L_1/L_3$ is about 2 or more;

$L_3$ is long enough so that a polymer going through said orifice is in substantial contact with the periphery of $S_3$ before exiting said orifice;

A and $S_3$ are perpendicular to $S_5$;

if said second zone has a one step area change, an angle T, which is an angle formed by $S_2$ and A, is about 45° to about 90°;

if said second zone has more than one step area change, an analogous angle of each step corresponding to said angle T is 45° to 90°;

an area of the orifice in said third zone is about 1.1 to 1.7 about times an area of the orifice at said first zone; and a shape of said first zone and a shape of said third zone are geometrically similar.

This invention also includes a polymer extrusion apparatus comprising a die and a means for pumping a polymer through said die, wherein the improvement comprises, a die for the extrusion of polymers having one or more flared orifices having the following components:

a first zone having surface $S_1$;

a second zone having surface $S_2$;

a third zone having surface $S_3$;

a length $L_1$ which is the total length of said first, second and third zones;

a length $L_3$ which is the length of said third zone;

a polymer flow axis A; and said die has a surface $S_5$ on a discharge side of said die; and wherein:

$L_1/L_3$ is about 2 or more;

$L_3$ is long enough so that a polymer going through said orifice is in substantial contact with the periphery of $S_3$ before exiting said orifice;

A and $S_3$ are perpendicular to $S_5$;

if said second zone has a one step area change, an angle T, which is an angle formed by $S_2$ and A, is about 45° to about 90°;

if said second zone has more than one step area change, an analogous angle of each step corresponding to said angle T is 45° to 90°;

an area of the orifice in said third zone is about 1.1 to 1.7 about times an area of the orifice at said first zone;

a shape of said first zone and a shape of said third zone are geometrically similar;

and providing that surface $S_5$ of said die is not in contact with a liquid cooling medium.

This invention further concerns a process for the extrusion of polymer, comprising extruding a polymer through a die having one or more flared orifices having the following components:

a first zone having surface $S_1$;

a second zone having surface $S_2$;

a third zone having surface $S_3$;

a length $L_1$ which is the total length of said first, second and third zones;

a length $L_3$ which is the length of said third zone;

a polymer flow axis A; and said die has a surface $S_5$ on a discharge side of said die; and wherein:

$L_1/L_3$ is about 2 or more;

$L_3$ is long enough so that a polymer going through said orifice is in substantial contact with the periphery of $S_3$ before exiting said orifice;

A and $S_3$ are perpendicular to $S_5$;

if said second zone has a one step area change, an angle T, which is an angle formed by $S_2$ and A, is about 45° to about 90°;

if said second zone has more than one step area change, an analogous angle of each step corresponding to said angle T is 45° to 90°;

an area of the orifice in said third zone is about 1.1 to about 1.7 times an area of the orifice at said first zone;

a shape of said first zone and a shape of said third zone are geometrically similar;

and providing that surface $S_5$ of said die is not in contact with a liquid cooling medium.

DETAILS OF THE INVENTION

The disclosure concerning the die and its orifices herein applies to the die itself, the die when included in an extrusion apparatus, and the die when used in the process of extruding polymer.

DESCRIPTION OF THE DRAWINGS

The figures herein are not to scale.

Figure 1:
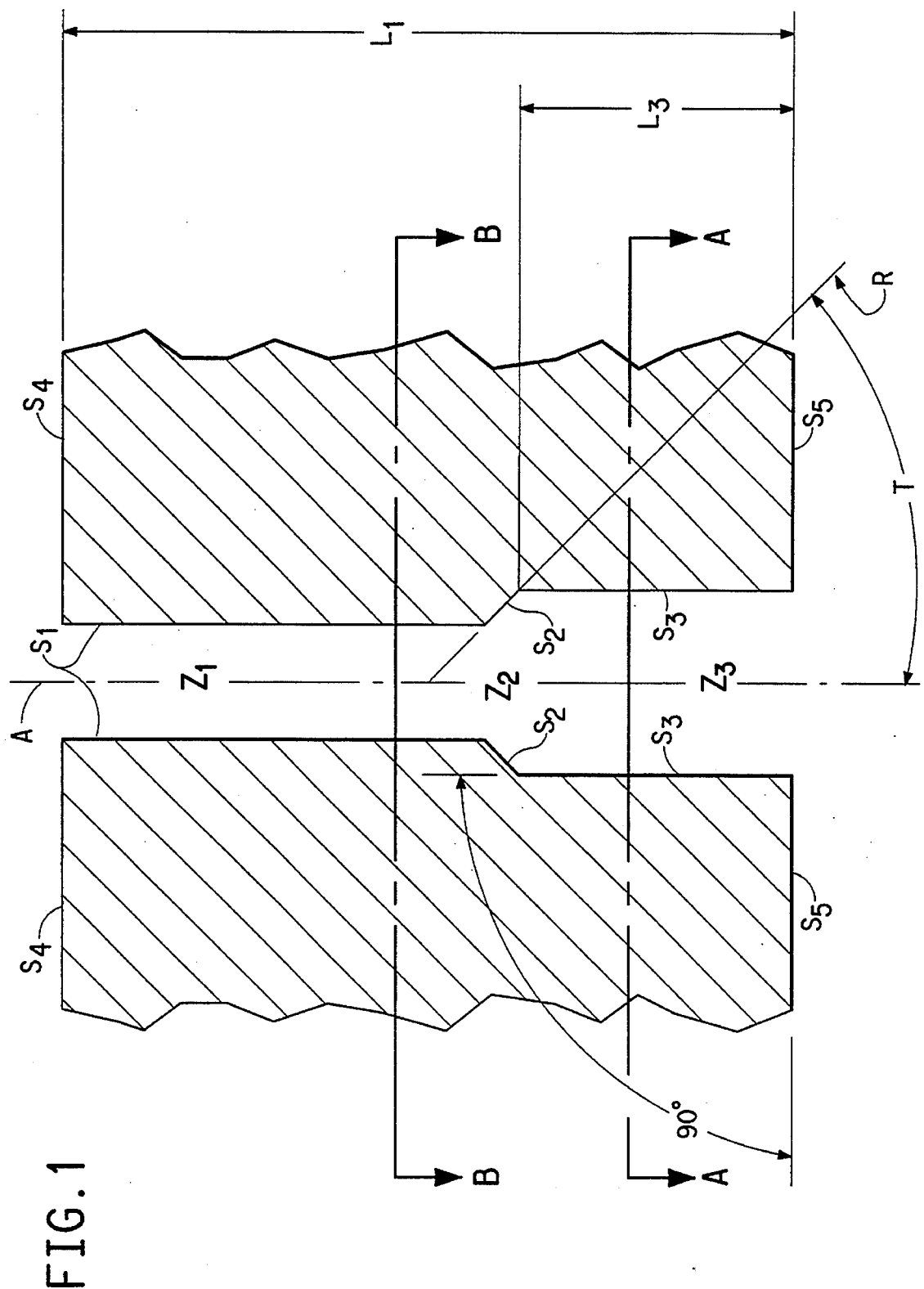
FIG. 1 is a cross section view (perpendicular to surface $S_5$) of a portion of the claimed die, showing in particular a cross section of an orifice in that die.

A cross section of a flared die orifice, with one step in $Z_2$ (see below), of this invention is shown in FIG. 1. This cross section is perpendicular to surface $S_5$ (see below). Only a part of the die body having one orifice is shown. The die may contain more than one orifice, and also may have other functional parts that extrusion dies may normally have, such as a means for attached the die to the extrusion apparatus, a means for measuring the temperature of the die, a means for heating the die, a means for sealing the contact surfaces between the die and the remainder of the extrusion apparatus (so molten polymer will not leak), etc.

Through the length of the orifice, the orifice can be considered to have three zones, a first zone $Z_1$ having surface $S_1$, a third (flared) zone $Z_3$ having surface $S_3$, and a second or transition zone $Z_2$ having surface $S_2$. $S_4$ of FIG. 1 is the surface on the inlet side of the die, while $S_5$ is the surface on the outlet or discharge side of the die. $S_4$ need not be flat, and $S_5$ must be flat and perpendicular to A only in proximity to the orifice (close enough for extrudate to touch $S_5$). It is preferred if $S_1$ is approximately parallel to polymer flow axis A (by approximately parallel is meant plus or minus 5°), and more preferred if $S_1$ is parallel to A. $S_3$, the orifice surface of $Z_3$, is parallel to the polymer flow axis A and perpendicular to surface $S_5$.

Cross sections AA and BB of the die in FIG. 1 are perpendicular to flow axis A. $L_1$ is the total length of the orifice, while $L_3$ is the length of zone $Z_3$. The cross sections at AA and BB go through the (complete) orifice shown in FIG. 1. The cross section BB is taken at a spot near where zones $Z_1$ and $Z_2$ meet, but it is in $Z_1$. The area of the orifice at the cross section AA is about 1.1 to 1.7 times the area of the same orifice at cross section BB, preferably about 1.3 to 1.45 (or the area after each step in $Z_2$ is at least 1.1 times the area of $Z_1$ or the previous step). $L_1/L_3$ is about two or more, preferably about 2 to about 20, and more preferably about 3 or more or about 3 to about 10.

The cross sections of the orifice at AA and BB are substantially geometrically similar to each other. By geometrically similar is meant "Two geometric figures are similar if one can be made congruent to the other by using a transformation of similitude, i.e., if one is a magnification or reduction of the other", definition of "similar" from James and James Mathematics Dictionary, 3rd Ed., D. Van Nostrand Co., Inc., Princeton, N.J., 1968, p. 331. In other words the orifice cross section at BB is a reduction in size of the cross section at AA, so that the area of the orifice cross section at AA is 1.1 to 1.7 times that at cross section AA.

The angle T is the angle formed by $S_2$ and A or approximately at which the orifice transitions from $S_1$ to $S_2$, if $Z_2$ contains one step. This transition may be in one step or a series of steps. The transition zone step(s) may also be in the form of a curve. The line R is then taken as a tangent to the curve at the point at which the curve meets the surface of $Z_1$. In a preferred die, angle T (or angles analogous to T in which $Z_2$ has more than one step) is about 60° to 90°.

Figure 2:
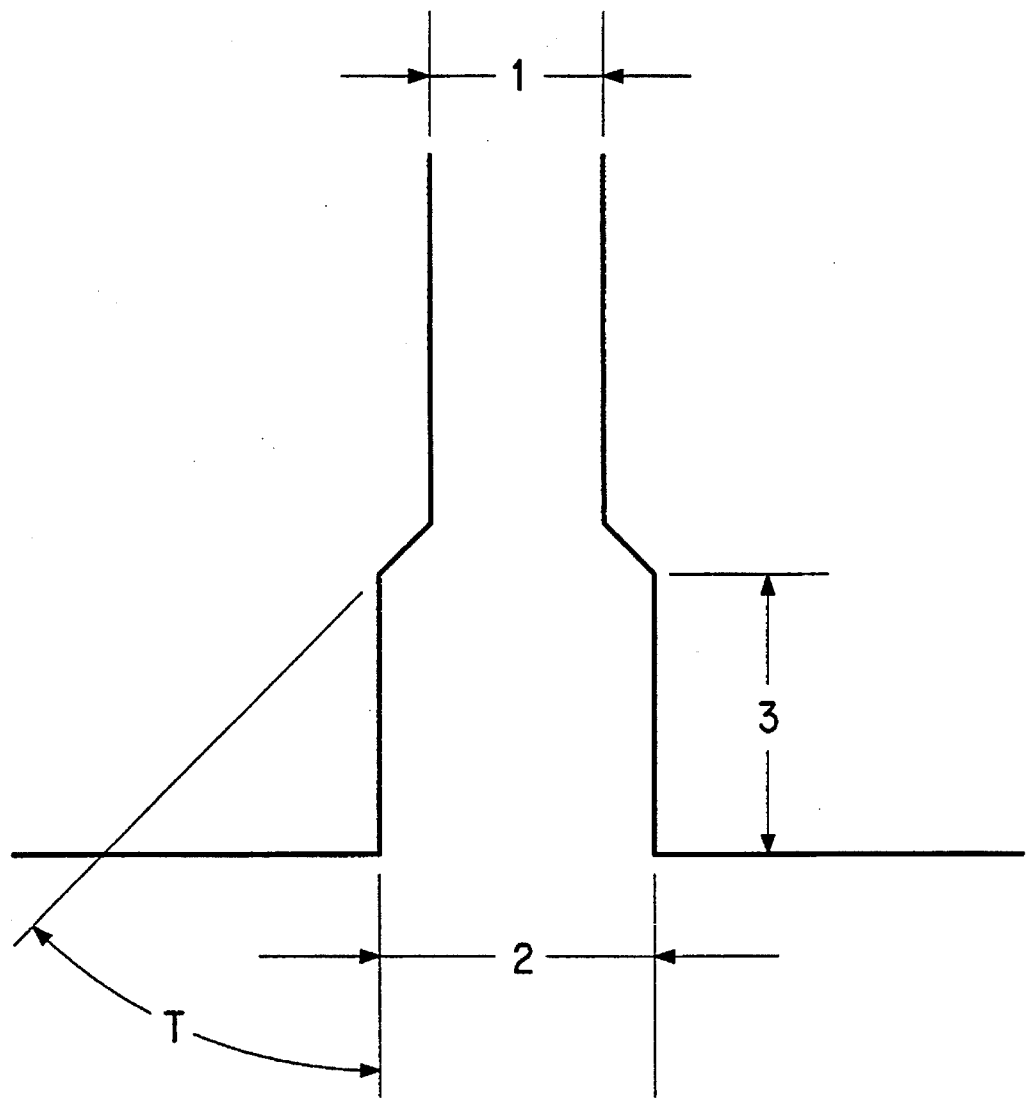
FIG. 2 is a schematic cross sectional view of a die orifice as used in Examples 1–5 to describe certain dimensions of the die orifice(s) in those Examples.

FIG. 2 is an outline of the orifice used in the Examples herein. It is described in those Examples.

As the polymer flows into $Z_1$ it of course assumes the cross sectional shape of $Z_1$ (cross section at BB). As the polymer flows through the transition zone, and then into $Z_3$, it expands to have a cross section such as that at AA, i.e., it eventually matches the shape and size of the orifice at $Z_3$. The polymer exiting the die will therefore have the shape and approximate size of the cross section at AA if $L_3$ is long enough (the cross section of the polymer exiting the die may be somewhat larger than the orifice cross section at AA due to the well known phenomenon of "die swell"). While $Z_1$ is necessary for the die orifice herein, the die may also include an "extension" of $Z_1$ (but not part of $L_1$ or $Z_1$) which is not necessarily the same size and/or shape as $Z_1$, which extension conducts melted polymer to $Z_1$.

Within $Z_2$, there may be one, or more than one, change in the area of orifice. Each change is herein termed a step. If there is a single step, the only requirement for $Z_2$ is the angle T be about 45° to 90°. $Z_3$, immediately adjacent to the step, has $S_3$ as its surface. If there is more than one step, each step has an angle which corresponds or is analogous to angle T when there is only one step. Each of these angles must also be about 45° about 90°. Only the orifice surface downstream (as the polymer flows) of the last step is $S_3$. All of the other surfaces in $Z_2$ which correspond to $S_3$ (herein collectively $S_{2A}$) in each of the other steps is in $Z_2$, and each of these surfaces is parallel to A. It is preferred that each of these surfaces parallel to A are long enough so that before the next step the polymer is substantially in contact with the periphery of each surface $S_{2A}$.

It is believed that the minimum value of $L_3$ is desirable because it allows the polymer to substantially achieve the final shape and size desired for the extrudate. By "substantially in contact with" is meant the polymer is either in contact with, or within 0.13 mm of the surface ($S_3$ and/or $S_{2A}$).

It is believed that $S_3$ and $S_{2A}$ should not extend too much longer than the length required for the polymer to substantially contact the full periphery of $S_3$ or $S_{2A}$. The length needed (of $S_3$ or $S_{2A}$) for any particular process, which includes the variables of extrudate shape and size, polymer used, polymer temperature, extrusion rate, etc., can be readily determined by simple routine experimentation, by varying $L_3$ in a series of die inserts, as inserts were used in the Examples herein.

The die may be made out of any material that polymer extrusion dies are usually made out of, such as tool steel. Care should be taken to avoid nicks and other blemishes on the orifice surfaces, especially at angled surfaces. The surface finish of the die should be that normally given to extrusion dies. All measurements herein are construed to have the usual machining and other fabrication errors normal in die manufacture.

The extrusion die may contain one or more orifices. Many dies have only one orifice, particularly if the cross section of the orifice is large. Other dies such as those for forming fibers (often called spinnerets) usually have many orifices. It is preferred if the cross sections at AA ($Z_1$) and BB ($Z_2$) (and hence the orifice) are both circular, both square or rectangular.

The extrusion may be carried out in any apparatus in which extrusions are normally done. Such an apparatus usually includes a means for melting the polymer (except if molten polymer is supplied to the apparatus), and a means to pump or force the molten polymer through the die orifices at an appropriate rate. Useful devices for pumping or melting and pumping are gear pumps, single and twin screw extruders, pistons (as in a ram extruder), or a pressurized vessel (as by gas pressure) containing molten polymer. Extrusion conditions, such as polymer temperature, may be those normally used in extrusions of that polymer.

After exiting the extrusion die the polymer is usually solidified (or in the case of elastomers may be crosslinked). Thermoplastics are normally solidified by cooling. The cooling medium may be air or a liquid such as water. If the cooling medium is a liquid, the liquid is not in contact with surface $S_5$ of the die. If the extrudate is to be cut into pieces, such as pellets, it is preferred if the cutter (blade) is not in direct contact with the die, particularly surface $S_5$.

The polymers useful with the extrusion die described herein include thermoplastics, elastomers before crosslinking, and thermosets before crosslinking. Thermoplastics include polyesters, polyamides, polyethers, polyolefins, halogenated polyolefins, fluorinated polyolefins, thermoplastic polyimides, poly(imide-ethers) and polycarbonates, and the like. Polymers which are extruded may contain the usual additives such as fillers, reinforcing agents, antioxidants, colorants, pigments, etc. Exemplary of these are carbon black, glass fiber, clay, mica, graphite fiber, titanium dioxide, carbon fibers and natural fibers.

In all of the Examples herein the orifices had a circular cross section (AA and BB).

EXPERIMENTAL APPARATUS FOR EXAMPLES 1–3

A 57 mm twin-screw Werner & Pfleiderer (W&P) extruder was used to melt the polymer and develop sufficient pressure to force the resin through the die. With the exception of the test die, all operating conditions, in terms of barrel temperatures, screw rpm, feed rates, etc. used were normal processing conditions for the polymer tested.

Rynite® and Zytel® resins are commercially available from E. I. du Pont de Nemours and Company.

EXAMPLE 1

The die plate used had holes for two die inserts. The inserts were placed into the die plate from the rear and secured with a retainer ring. The first insert, which was the control, had a standard configuration with a 4.5 mm diameter die land and an aspect ratio of 3/1. The second insert, the test orifice, had a flared section at the end of the die, as shown in FIG. 2. The inner diameter in the first section of the die land (shown as 1 in FIG. 2) was 4.5 mm, as with the control die. The inner diameter of the flared section (indicated by 2 in FIG. 2) was 5.4 mm, giving a diameter ratio of 1.2. The ratio of the area in the expanded section to the unexpanded section was 1.44. The depth of the flare from the face into the die (shown as 3 in FIG. 2) was 6 mm, or 1.33 times the original diameter.

The total throughput of resin was 68 kg/hr, or 34 kg/hr/orifice. The resin tested was Zytel® 70G33, nylon 6,6 reinforced with 33% chopped glass fiber. Within 30 seconds after startup, accumulation of drips was evident at the exit of the strand from the standard die. The strand exiting from the flared die showed improved strand quality and no drips. Five minutes after startup, the exit face of the die surrounding the flared die was still clean. The exit face surrounding the standard die was surrounded with die drips which were approximately ⅛–¼" long and beginning to turn brown due to thermal degradation.

EXAMPLE 2

The extruder and die plate were identical to those described in Example 1. The resin tested was Rynite® 530, a blend containing primarily of poly(ethylene terephthalate) resin and 30% chopped glass fiber. The test was run with a throughput of 68 kg/hr through 2 orifices. An extremely rapid buildup of drips was observed on the standard die, with significant accumulation in less than 2 minutes. Small droplets of molten resin were observed surrounding the flared die exit shortly after startup. After 5 minutes, the die face surrounding the standard die was coated with a mixture of resin and fiberglass, and substantial degradation was evident. The die face surrounding the flared die showed the original droplets but no growth had occurred. After 10 minutes, large accumulations of drips were evident at the standard die, and the drips were beginning to interfere with the flow of the strand. The flared die still showed no growth of the initial droplets.

EXAMPLE 3

The extruder and die plate were identical to those described above. The resin tested was Zytel® 103, an unreinforced nylon-6,6 resin. Approximately 20 minutes after startup, the standard die showed growth of drips surrounding the exit of the strand from the die. The die face surrounding the flared die remained clear. Sixty minutes after startup, growth of the accumulations around the standard die had continued and the flared die remained clear. Although the rate of accumulation of die drips on the standard straight through die was slower for unreinforced resins than for the two reinforced resins cited in Examples 1 and 2, the flared die provided an operating improvement vs. the standard straight through die.

EXAMPLE 4

A 40 mm W&P twin-screw extruder was used to melt the resin and develop pressure sufficient to force the melt through the die plate. The die plate used was the same as described in Example 1 above. The resin tested was Rynite® 530 at 68 kg/hr. The diameter of the original land (1 in FIG. 2) was 4.5 mm. The diameter of the flared section (2 in FIG. 2) was 5.4 mm. The flared section extended 6.0 mm back from the face of the die. The second orifice tested had two expansions, from 4.5 mm to 4.8 mm and from 4.8 mm to 5.4 mm (diameter ratios of 1.067 and 1.125). Each flared section had a length of 4 mm. Both of these configurations were effective in reducing the accumulation of die drips at the die face exit when compared to the standard, straight-through die design.

EXAMPLE 5

A 40 mmW&P twin-screw extruder was used to melt the resin and develop pressure sufficient to force the melt through the die plate. The die plate used was the same as described above. The resin tested was Rynite® 530 at 68 kg/hr. The extruder was operated at normal processing conditions. The first orifice tested was the flared orifice with 1.2× ratio of diameters described above in Example 4. The second die tested had three expansions, from 4.5 mm to 4.8 mm, from 4.8 mm to 5.05 mm and from 5.05 to 5.4 mm. Each flared section had a length of 3 mm. Both of these configurations were effective in reducing the accumulation of die drips at the die face exit when compared to the standard, straight-through die design.

What is claimed is:

1. A die having flared orifices for the extrusion of polymer, comprising, a die body having one or more flared orifices having the following components:

a first zone having surface $S_1$;

a second zone having surface $S_2$;

a third zone having surface $S_3$;

a length $L_1$ which is the total length of said first, second and third zones;

a length $L_3$ which is the length of said third zone;

a polymer flow axis A; and said die has a surface $S_5$ on a discharge side of said die; and wherein:

$L_1/L_3$ is about 2 or more;

$L_3$ is long enough so that a polymer going through said orifice is in substantial contact with the periphery of $S_3$ before exiting said orifice;

A and $S_3$ are perpendicular to $S_5$;

if said second zone has a one step area change, an angle T, which is an angle formed by $S_2$ and A, is about 45° to about 90°;

if said second zone has more than one step area change, an analogous angle of each step corresponding to said angle T is 45° to 90°;

an area of the orifice in said third zone is about 1.1 to about 1.7 times an area of the orifice at said first zone;

a shape of said first zone and a shape of said third zone are geometrically similar; and $S_1$ is approximately parallel to A;

wherein said die is adapted for said polymer to flow consecutively through said first zone, said second zone, and then said third zone, thereafter exiting said die.

2. The die as recited in claim 1 wherein $L_1/L_3$ is about 3 to about 10.

3. The die as recited in claim 1 wherein the angle T or analogous angles are about 60° to about 90°.

4. The die as recited claim 1 wherein the area of the orifice in said first zone is about 1.30 to about 1.45 times the area of the orifice in said third zone.

5. The die as recited in claim 1 wherein $L_1/L_3$ is about 3 to about 10, $S_1$ is approximately parallel to A, the angle T or analogous angles are about 60° to about 90°, and the area of the orifice in said first zone is about 1.30 to about 1.45 times the area of the orifice in said third zone.

6. A polymer extrusion apparatus comprising a die and a means for pumping a polymer though said die, wherein the improvement comprises, a die for the extrusion of polymers having one or more flared orifices having the following components:

a first zone having surface $S_1$;

a second zone having surface $S_2$;

a third zone having surface $S_3$;

a length $L_1$ which is the total length of said first, second and third zones;

a length $L_3$ which is the length of said third zone;

a polymer flow axis A; and said die has a surface $S_5$ on a discharge side of said die; and wherein:

$L_1/L_3$ is about 2 or more;

$L_3$ is long enough so that a polymer going through said orifice is in substantial contact with the periphery of $S_3$ before exiting said orifice;

A and $S_3$ are perpendicular to $S_5$;

if said second zone has a one step area change, an angle T, which is an angle formed by of $S_2$ and A, is about 45° to about 90°;

if said second zone has more than one step area change, an analogous angle of each step corresponding to said angle T is 45° to 90°;

an area of the orifice in said third zone is about 1.1 to 1.7 about times an area of the orifice at said first zone;

a shape of said first zone and a shape of said third zone are geometrically similar;

surface $S_2$ of said parallel flared die is not in contact with a liquid cooling medium; and $S_1$ is approximately parallel to A;

wherein said die is adapted for said polymer to flow consecutively through said first zone, said second zone, and then said third zone, thereafter exiting said die.

7. The apparatus as recited in claim 6 wherein $L_1/L_3$ is about 3 to about 10.

8. The apparatus as recited in claim 6 wherein the angle T or analogous angles are about 60° to about 90°.

9. The apparatus as recited claim 6 wherein the area of the orifice in said first zone is about 1.30 to about 1.45 times the area of the orifice in said third zone.

10. The apparatus as recited in claim 6 wherein $L_1/L_3$ is about 3 to about 10, $S_1$ is approximately parallel to A, the angle T or analogous angles are about 60° to about 90°, and the area of the orifice in said first zone is about 1.30 to about 1.45 times the area of the orifice in said third zone.

11. A process for the extrusion of polymer, comprising extruding a polymer through a die having one or more flared orifices having the following components:

a first zone having surface $S_1$;

a second zone having surface $S_2$;

a third zone having surface $S_3$;

a length $L_1$ which is the total length of said first, second and third zones;

a length $L_3$ which is the length of said third zone;

a polymer flow axis A; and said die has a surface $S_5$ on a discharge side of said die; and wherein:

$L_1/L_3$ is about 2 or more;

$L_3$ is long enough so that a polymer going through said orifice is in substantial contact with the periphery of $S_3$ before exiting said orifice;

A and $S_3$ are perpendicular to $S_5$;

if said second zone has a one step area change, an angle T, which is by $S_2$ and A, is about 45° to about 90°;

if said second zone has more than one step area change, an analogous angle of each step corresponding to said angle T is 45° to 90°;

an area of the orifice in said third zone is about 1.1 to 1.7 about times an area of the orifice at said first zone;

a shape of said first zone and a shape of said third zone are geometrically similar;

surface $S_5$ of said die is not in contact with a liquid cooling medium; and $S_1$ is approximately parallel to A;

wherein said polymer flows consecutively through said first zone, said second zone, and then said third zone, thereafter exiting said die.

12. The process as recited in claim 11 wherein $L_1/L_3$ is about 3 to about 10.

13. The process as recited in claim 11 wherein the angle T or analogous angles are about 60° to about 90°.

14. The process recited claim 11 wherein the area of the orifice in said first zone is about 1.30 to about 1.45 times the area of the orifice in said third zone.

15. The process as recited in claim 11 wherein $L_1/L_3$ is about 3 to about 10, $S_1$ is approximately parallel to A, the angle T or analogous angles are about 60° to about 90°, and the area of the orifice in said first zone is about 1.30 to about 1.45 times the area of the orifice in said third zone.

\* \* \* \* \*

REEXAMINATION CERTIFICATE (3593rd)

United States Patent [19]
Rakestraw et al.

[11] B1 5,458,836
[45] Certificate Issued Aug. 4, 1998

[54] POLYMER EXTRUSION DIE AND USE THEREOF

[75] Inventors: Julie A. Rakestraw, Newark; Marion G. Waggoner, Hockessin, both of Del.

[73] Assignee: E. I. du Pont de Nemours and Company, Wilmington, Del.

Reexamination Request:
No. 90/004,174, Mar. 7, 1996

Reexamination Certificate for:
Patent No.: 5,458,836
Issued: Oct. 17, 1995
Appl. No.: 212,080
Filed: Mar. 11, 1994

[51] Int. Cl.$^6$ .................................................. B29C 47/12
[52] U.S. Cl. ........... 264/169; 264/143; 264/211.23; 264/323; 425/308; 425/382 R; 425/461
[58] Field of Search ................... 264/169, 142, 264/143, 323, 211–23, 141, 176.1; 425/463, 464, 308, 461, 382 R

[56] References Cited

U.S. PATENT DOCUMENTS

| | | | |
|---|---|---|---|
| 3,391,657 | 7/1968 | Reese | 425/461 |
| 4,056,597 | 11/1977 | Cooper | 425/464 |
| 4,822,546 | 4/1989 | Lohkamp | 264/143 |
| 5,417,907 | 5/1995 | Ohhata et al. | 264/169 |

FOREIGN PATENT DOCUMENTS

| | | | |
|---|---|---|---|
| 52-63415 | 5/1977 | Japan | |
| 54-68409 | 6/1979 | Japan | |
| 61-000614 | 1/1986 | Japan | 264/169 |

*Primary Examiner*—Mathieu D. Vargot

[57] ABSTRACT

An improved die, containing one or more orifices, for the extrusion of polymers is disclosed wherein the orifices are flared at the polymer discharge end, and the orifices have certain relative dimensions and configurations. The dies are useful for producing items such as films, shaped profiles, sheets, fibers, strands, etc. Also disclosed are a process for using the die, and an extrusion apparatus containing such a die.

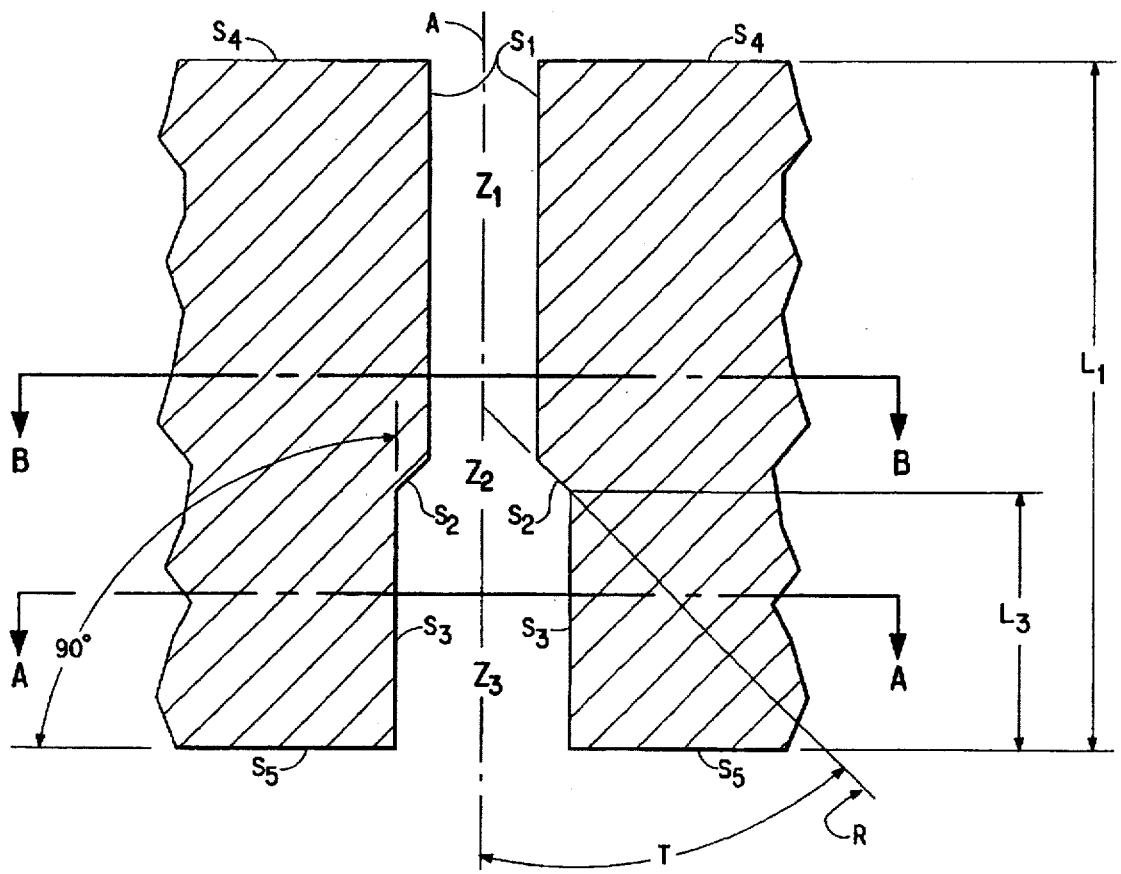

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–15 is confirmed.

New claims 16 and 17 are added and determined to be patentable.

*16. The apparatus as recited in claim 5 wherein said die is not in contact with a liquid cooling medium.*

*17. The process as recited in claim 11 wherein said die is not in contact with a liquid cooling medium.*

* * * * *